Dec. 1, 1931.    I. SIKORSKY    1,833,917
AIRCRAFT, INCLUDING WINDOWS FOR SAME
Filed May 7, 1929    2 Sheets-Sheet 1
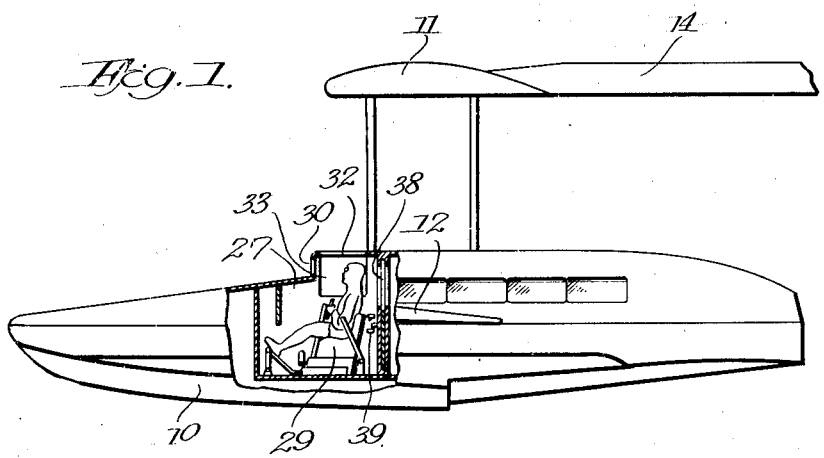
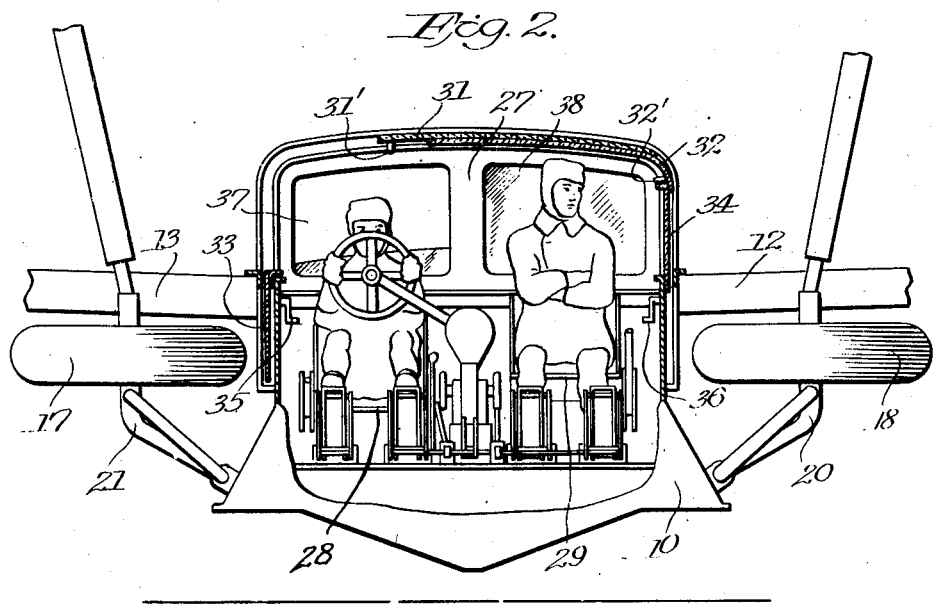
Igor Sikorsky,
INVENTOR
BY
ATTORNEY Dec. 1, 1931.  I. SIKORSKY  1,833,917
AIRCRAFT, INCLUDING WINDOWS FOR SAME
Filed May 7, 1929  2 Sheets-Sheet 2

Igor Sikorsky,
INVENTOR
BY
ATTORNEY

Patented Dec. 1, 1931

1,833,917

UNITED STATES PATENT OFFICE

IGOR SIKORSKY, OF COLLEGE POINT, NEW YORK, ASSIGNOR TO SIKORSKY AVIATION CORPORATION, OF WILMINGTON, DELAWARE, A CORPORATION OF DELAWARE

AIRCRAFT, INCLUDING WINDOWS FOR SAME

Original application filed January 19, 1929, Serial No. 333,603. Divided and this application filed May 7, 1929. Serial No. 361,179.

The present invention relates to aircraft construction and particularly to the arrangement of a pilots' compartment in an aircraft cabin or the like. The invention has particular reference to the arrangement of windows in such a compartment so that a clear view above, to the sides, and frontwardly and rearwardly is afforded the pilot or pilots.

In the accompanying drawings I have shown the invention embodied in the body-boat of an amphibian, but it will be understood that the invention is not restricted to this type of craft.

In the drawings:

Figure 1 is an elevation of an amphibian (the empennage being omitted), the body-boat being shown with its side at the pilots' compartment broken away.

Figure 2 is a transverse section through the pilots' compartment.

Figures 3, 4:
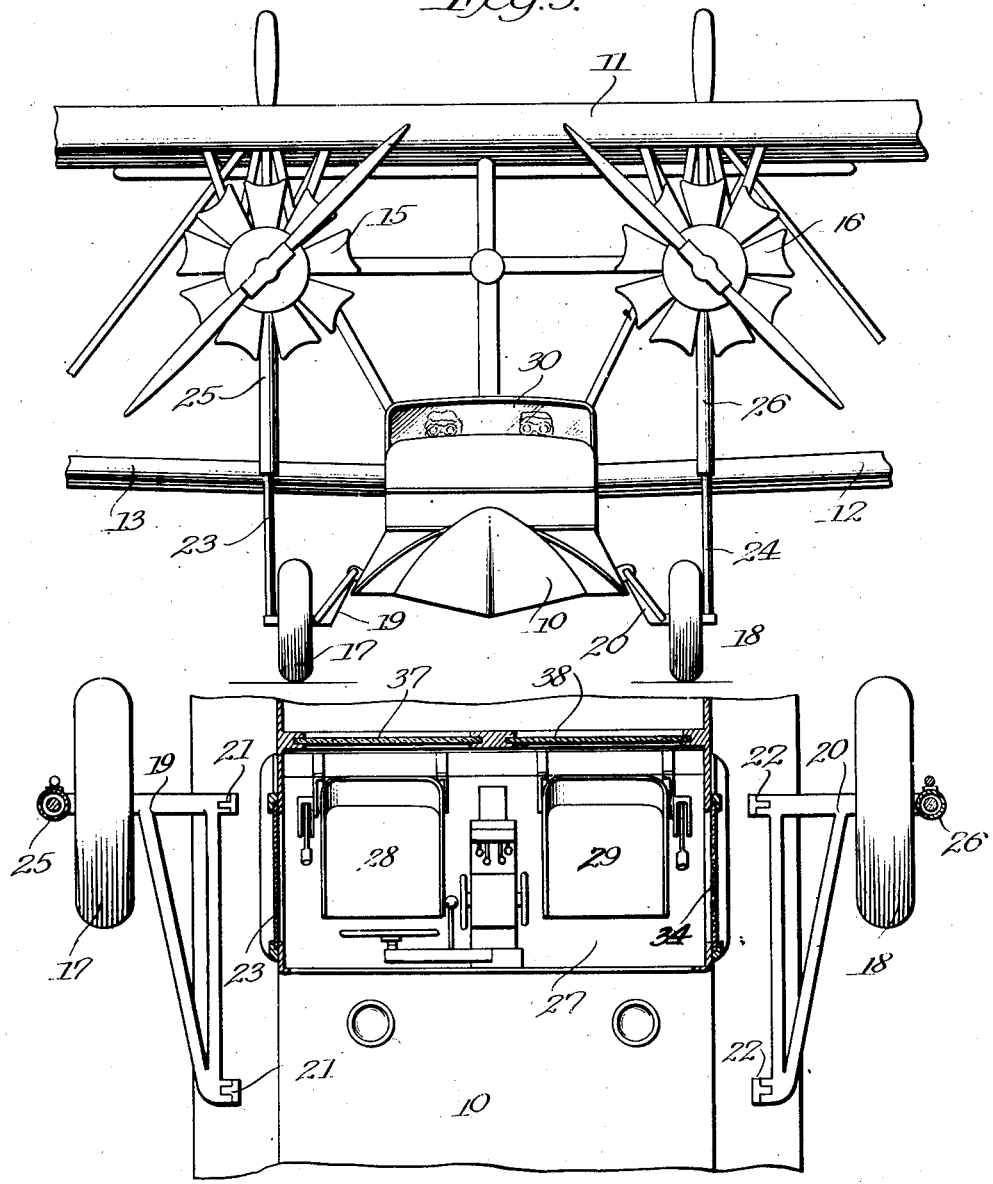
Figure 3 is an elevation of the central portion of the amphibian.
Figure 4 is a plan view of a portion of the body-boat with the pilots' compartment in horizontal section.

Referring to the drawings, 10 indicates a body-boat, 11 a main plane disposed above the body-boat, 12 and 13 lower planes projecting laterally of the body-boat, and 14 an outrigger which at its rear end assists in the support of an empennage not shown.

A pair of motors 15 and 16 are supported in symmetrical relation to the body-boat, and the latter is supportable, when desired, on landing wheels 17 and 18 mounted on axle brackets 19 and 20, swingable about pivot points 21 and 22. To the outer ends of the axle brackets are pivoted rods 23 and 24 provided at their upper ends with piston heads working in cylinders 25 and 26, which latter are in pivotal connection at their upper ends with the main plane structure. By manipulation of suitable control devices which have been described in my copending application Serial No. 333,603, filed Jan. 19, 1929, of which this application is a division, means have been described whereby hydraulic pressure may be admitted in cylinders 25 and 26 at either side of the piston heads therein to cause the projection and retraction of rods 23 and 24. When the rods are projected the wheels take the operative position shown in Figure 3, while when the rods are retracted the wheels take the inoperative position shown in Figure 2, brackets 19 and 20 pivoting about normally substantially horizontal axes.

The pilots' compartment 27 is located somewhat forward of the central portion of the body-boat so that the pilots' seats 28 and 29, which are arranged side by side, are beneath the leading edge of main plane 11. Transversely of the compartment at substantially its central portion the roof of the body-boat is stepped downwardly to present a forwardly faced substantially vertical frame in which is set a transverse window 30 of any suitable material. To the rear of window 30 the arched roof and side walls of the pilots' compartment are provided with a continuous transverse opening of suitable width, the edges of the opening being provided with guideways adapted to receive slidable closure means. As shown particularly in Figure 2, flexible transparent strips 31 and 32 have their inner ends overlapped and are slidable, by means of grips 31' and 32', from the position of member 32, whose outer edge extends just below the curvature of the roof, to the position of member 31. Windows 33 and 34, operable in the well-understood manner by means of cranks 35 and 36, may be moved from the open position, that is, the position of window 33, to the closed position of window 34, with its upper edge overlapping the lower edge of flexible member 32.

A passenger compartment is located directly to the rear of the pilots' compartment, and is separated from the latter by means of vertically slidable windows 37 and 38 which may be manipulated as by a crank 39 in the same manner as windows 33 and 34.

Since the control apparatus forms no part of the present invention, and has been fully described in my application above mentioned, it will be unnecessary to describe it here.

It will be noted that both the motors and the landing wheels are disposed slightly forward of the lower planes 12 and 13, as are likewise windows 31 to 34, at least for the most part. This being the case, the pilots may at all times have a view of the landing wheels and motors, as well as extended vision laterally and upwardly. If the windows become frosted or otherwise obscured, they may be opened so that vision will not be interfered with. The arrangement is such that the windows may be opened by the pilots without moving from their seats. It will be noted that even with all the windows closed under ordinary conditions, the pilots will have substantially uninterrupted vision from side to side and across the top of the compartment.

Having thus described my invention, what I claim is:

1. In an aircraft, a body member, a pilot's compartment in said body member having an arched roof portion provided with a transverse opening, and a flexible transparent window member slidable in said opening, said opening being continued downwardly in the side walls of said compartment, and displaceable closure means for the openings in said side walls.

2. In an aircraft, a body member, a pilot's compartment in said body member having an arched roof portion provided with a transverse opening, and a pair of flexible transparent window members overlapped at their inner ends and slidable in opposite directions to open or close the end portions of said opening, said window members forming a top closure for said opening in all adjusted positions.

3. In an aircraft, a body member, a supporting surface above and extending transversely of said body member, a pilot's compartment in said body member, the enclosing walls of said compartment having side and top openings lying between vertical planes at the front of and parallel to the leading edge of said supporting surface, and transparent window means in said openings.

4. In an aircraft, a body member, a supporting surface above and extending transversely of said body member, a pilot's compartment in said body member, the enclosing walls of said compartment having side and top openings lying between vertical planes at the front of and parallel to the leading edge of said supporting surface, and slidable transparent windows in said openings.

5. In an aircraft, a body member, a supporting surface above and extending transversely of said body member, a pilot's compartment in said body member, a pair of pilot's seats arranged side by side in said compartment, the enclosing walls of said compartment having side and top openings between vertical planes at the front of and parallel to the leading edge of said supporting surface, transparent windows slidable in said openings, said windows being within operating reach of the pilot's seats.

6. In an aircraft, a body member, a compartment in said body member having side walls and a roof, said roof having a transverse opening therein, transparent window means in said opening, said opening being continued downwardly at each end into the side walls, and slidable transparent closure means for said continuations.

7. In an aircraft, a body member, a compartment in said body member having side walls and a roof, said roof having a transverse opening therein, transparent window means in said opening, said opening being continued downwardly at each end into the side walls, and vertically slidable transparent closure means for said continuations, said closure means when in closed position being adapted to abut the extremities of said window means.

8. In an aircraft, a body member, a supporting surface above and extending transversely of said body member, a pilots' compartment in said body member forwardly of said supporting surface, said body member having a roof stepped downwardly transversely of the pilots' compartment to present a forwardly faced frame, transparent means arranged in said frame, the roof being provided with a transverse opening to the rear of said frame, said body member having side walls having openings forming downward continuations of said transverse opening, and transparent closure means for said opening and its downward continuations.

9. In an aircraft, a body member, a supporting surface above and extending transversely of said body member, a pilots' compartment in said body member forwardly of said supporting surface, said body member having a roof stepped downwardly transversely of the pilots' compartment to present a forwardly faced frame, transparent means arranged in said frame, the roof being provided with a transverse opening to the rear of said frame, said body member having side walls having openings forming downward continuations of said transverse opening, a pair of flexible transparent window members overlapped at their inner ends and slidable in opposite directions to open or close the end portions of said transverse opening, and separate displaceable closure means for the downward continuation of said opening, said last named closure means being vertically slidable and adapted when in closed position to abut the outer ends of said window members.

Signed at College Point, Long Island, in the county of Queens and State of New York this 27th day of March A. D. 1929.

IGOR SIKORSKY.